United States Patent [19]

Kamps

[11] Patent Number: 5,774,364
[45] Date of Patent: Jun. 30, 1998

[54] FASTENING DEVICE

[75] Inventor: Rolf Kamps, Wuppertal, Germany

[73] Assignee: Stocko Fasteners GmbH, Wuppertal, Germany

[21] Appl. No.: 702,162

[22] Filed: Aug. 23, 1996

[30] Foreign Application Priority Data

Aug. 24, 1995 [DE] Germany .................. 195 31 176.0

[51] Int. Cl.$^6$ .................. G06F 19/00; A41H 37/04
[52] U.S. Cl. .................. 364/468.24; 364/468.01; 364/188; D29/243.53; 227/109
[58] Field of Search .................. 364/468.01, 188, 364/191, 474.22, 474.02, 468.24; 395/183.22; 29/243.53, 432; 112/470.04, 454, 458; 227/18, 109

[56] References Cited

U.S. PATENT DOCUMENTS 4,694,984   9/1987   Altwicker .................. 227/18
4,872,167  10/1989   Maezawa et al. .................. 395/183.22
5,109,785   5/1992   Inoue et al. .................. 112/470.04

FOREIGN PATENT DOCUMENTS 0193707   8/1989   European Pat. Off. .

*Primary Examiner*—Reba I. Elmore
*Assistant Examiner*—Steven R. Garland
*Attorney, Agent, or Firm*—Friedrich Kueffner

[57] ABSTRACT

A device for sequentially fastening elements of different types to a carrier material, preferably for fastening closing elements, such as, snap fastener elements, to articles of textile, leather or synthetic material, in accordance with a predetermined program which is composed of a number of sequentially occurring program steps, wherein each step determines the type of elements to be fastened. A display is arranged on a control panel and is operable for displaying the program. The device is provided with a display which has a number of display windows, wherein each display window is assigned to one of the program steps and can be operated for indicating the element type fastened with the program step.

23 Claims, 2 Drawing Sheets

FASTENING DEVICE

BACKGROUND OF THE INVENTION

1. Field of the Invention

The present invention relates to a device for sequentially fastening elements of different types to a carrier material, preferably for fastening closing elements, such as, snap fastener elements, to articles of textile, leather or synthetic material, in accordance with a predetermined program which is composed of a number of sequentially occurring program steps, wherein each step determines the type of elements to be fastened, with a display arranged on a control panel and operable for displaying the program.

2. Description of the Related Art

When fastening snap fastener elements to articles of textile, leather or synthetic material, generally at least two types of snap fastener elements are required, namely, a socket element and a male or ball element which can be inserted into the socket element and can be releasably secured in this manner. Moreover, these elements usually are composed of two parts, namely, of a fastening part, for example, in the form of a toothed ring, and the actual snap fastener part. For adapting the snap fastener elements to the surface configuration of the articles to which they are to be fastened, different types of fastener parts, for example, fastener parts having different colors, are used in some cases.

For fastening the above-described snap fastener elements, usually a press-like fastening device is used which includes an upper tool and a lower tool which can be pressed against each other. A snap fastener part is supplied to the one tool and a fastening part is supplied to the other tool. After introducing the carrier material between the upper tool and the lower tool, the snap fastener part can be fastened with the fastening part to the carrier material by pressing the two tools against each other.

For fastening different types of snap fastener elements which may differ from each other with respect to the snap fastener part and/or the fastening part, to a carrier material, snap fastener parts and/or fastening parts are supplied from different magazines to the upper tool and/or the lower tool. For example, socket parts and male parts are supplied to the upper tool from appropriate magazines, while fastening parts of different colors are supplied to the lower tool. The supply of snap fastener parts can be controlled in accordance with a predetermined program which includes a number of sequentially occurring program steps corresponding to the number of snap fastener elements to be fastened to an article, wherein each program step determines the type of the respective element to be fastened, i.e., exactly one snap fastener part to be supplied to one of the pressing tools and one fastening part to be supplied to the other pressing tool are selected.

A device of the above-described is known, for example, from EP O 193 707 B1. In this document, it is proposed to divide the program into a number of work steps, wherein during each work step a predeterminable number of snap fastener elements of the same type are sequentially fastened and a change of the type of the snap fastener element to be fastened can take place between the individual work steps. For displaying a work program composed of a number of such work steps, the use of a display is proposed which includes a number of display windows corresponding to the number of work steps. These display windows can each be operated for displaying the number of snap fastener elements to be fastened during one of the work steps, i.e., the number of program steps to be carried out in a work step.

The fastening device described above makes it possible, by using only one press, to carry out the program-controlled fastening of snap fastener elements of different types which differ from each other with respect to the snap fastener part and/or the fastening part. For this purpose, between carrying out the individual program steps of the program, the operator must move the article to be provided with the snap fastener elements between the pressing tools, so that that location of the article comes to rest exactly between the pressing tools to which a snap fastener element is to be fastened during the respectively next program step. When using the conventional fastening device, the article is frequently incorrectly positioned between the pressing tools, so that a snap fastener element of the incorrect type is fastened to the article at a location which is intended for fastening a snap fastener element.

SUMMARY OF THE INVENTION

In view of this technical problem in the state of the art, it is the primary object of the present invention to provide a fastening device of the above-described type which, for reducing the number of incorrect fastenings, permits an examination of the program sequence when elements of different types are being fastened to a carrier material.

In accordance with the invention, this object is met by providing the device of the above-described type with a display which has a number of display windows, wherein each display window is assigned to one of the program steps and can be operated for indicating the element type fastened with the program step.

A display of this type provides a complete overview of the entire program sequence to the operator of the fastening device when the program is carried out. Thus, before carrying out the first program step, the operator can examine which type of element is to be fastened first and the operator can position the carrier material accordingly. During the further sequence of carrying out the program, a comparison of the elements fastened with the program steps already carried out and the indications in the display field assigned to these program steps, makes it possible to determine to what extent the program has already progressed and an evaluation of the type of element to be fastened in the next program step can be carried out. In this manner, the display according to the invention facilitates an examination of the fastening operation during the entire program sequence.

A particularly simple examination of the fastening operation is made possible when the display fields are arranged in the sequence of the program steps to which they are assigned.

Another improvement of the clarity of the display can be achieved if the display fields are arranged on the control panel along a predetermined straight line.

For making clear the correlation between the individual program steps and the display fields, it is advantageous if each display field has a marking, preferably a program step number, which is arranged on the control panel and indicates the program step to which the respective display field is assigned.

For displaying the types of elements to be fastened during the individual steps, each display field advantageously has at least two display elements. For ensuring a clear representation of the program sequence, the display elements are advantageously arranged along lines extending perpendicularly to the predetermined straight line.

A particularly clear display element grid can be achieved if the display elements are arranged on the display panel along a plurality of straight lines extending parallel to the predetermined straight line.

For a better correlation of the individual display elements arranged along the lines extending perpendicular to the predetermined straight line to the individual types of elements, each of the straight lines extending parallel to the predetermined straight line is advantageously provided with a marking serving of the identification of the types of elements.

It becomes easier to examine which type of element is to be fastened with the next program step if the display can be operated during the program sequence for identifying the display field assigned to the respectively next program step.

If light diodes are used as display elements, this identification can be achieved particularly easily if the light diode or diodes of the display fields to be identified are operated intermittently.

If the elements to be fastened are composed of several parts and the individual types of elements can be distinguished from each other with respect to at least one of the element parts, it is particularly advantageous if each display field has at least two display elements serving for identifying the kind of one of the element parts with respect to which the types of elements can be distinguished from each other.

The variability of the fastening device according the invention is increased if it includes a device for storing a number of predetermined programs, a device for selecting one of the programs and a display field for displaying an information characterizing the selected program.

The above-described arrangement for the display which can be operated for displaying the program can also be advantageously used for simplifying and increasing the reliability when preparing the program. For this purpose, the device according to the invention usefully has a device for preparing a program for sequentially fastening elements of different types to a carrier material, preferably for fastening closing elements, such as, snap fastener elements to articles of textile, leather or synthetic material, wherein the program is composed of a number of sequentially occurring program steps by means of which the respective type of an element to be fastened is determined, and a display operable for displaying the program, wherein the display is formed in the above-explained manner.

For simplifying the preparation of the program, the display can be operated advantageously during the preparation of the program for identifying the display field assigned to the program step to be entered next, for example, by an intermittent operation of display elements in the form of light diodes of this display field.

Moreover, it is advantageous if the display can be operated during the preparation of the program for displaying the types of elements determined by the already entered program steps in the display fields assigned to the these program steps.

A particularly compact arrangement of the fastening device or of the control panel of the fastening device is achieved if a device is provided for switching the device between a programming operation and a fastening operation and if only one display is provided for displaying the program during the programming operation and the fastening operation.

Advantageously, a display field is provided which can be operated for identifying the type of operation.

The switching device can be constructed particularly simply in the form of only one switching key mounted on the control panel.

An arrangement of the input device which is particularly simple and still permits a variable programming of the fastening device is achieved if the input device includes a number of keys serving for selecting the type of elements to be fastened with the individual program steps and a key serving for selecting the respectively next program step.

The display, the key area and the switching key are advantageously mounted on only one control panel.

The various features of novelty which characterize the invention are pointed out with particularity in the claims annexed to and forming a part of the disclosure. For a better understanding of the invention, its operating advantages, specific objects attained by its use, reference should be had to the drawing and descriptive manner in which there are illustrated and described preferred embodiments of the invention.

DESCRIPTION OF THE PREFERRED EMBODIMENTS

Figure 1:
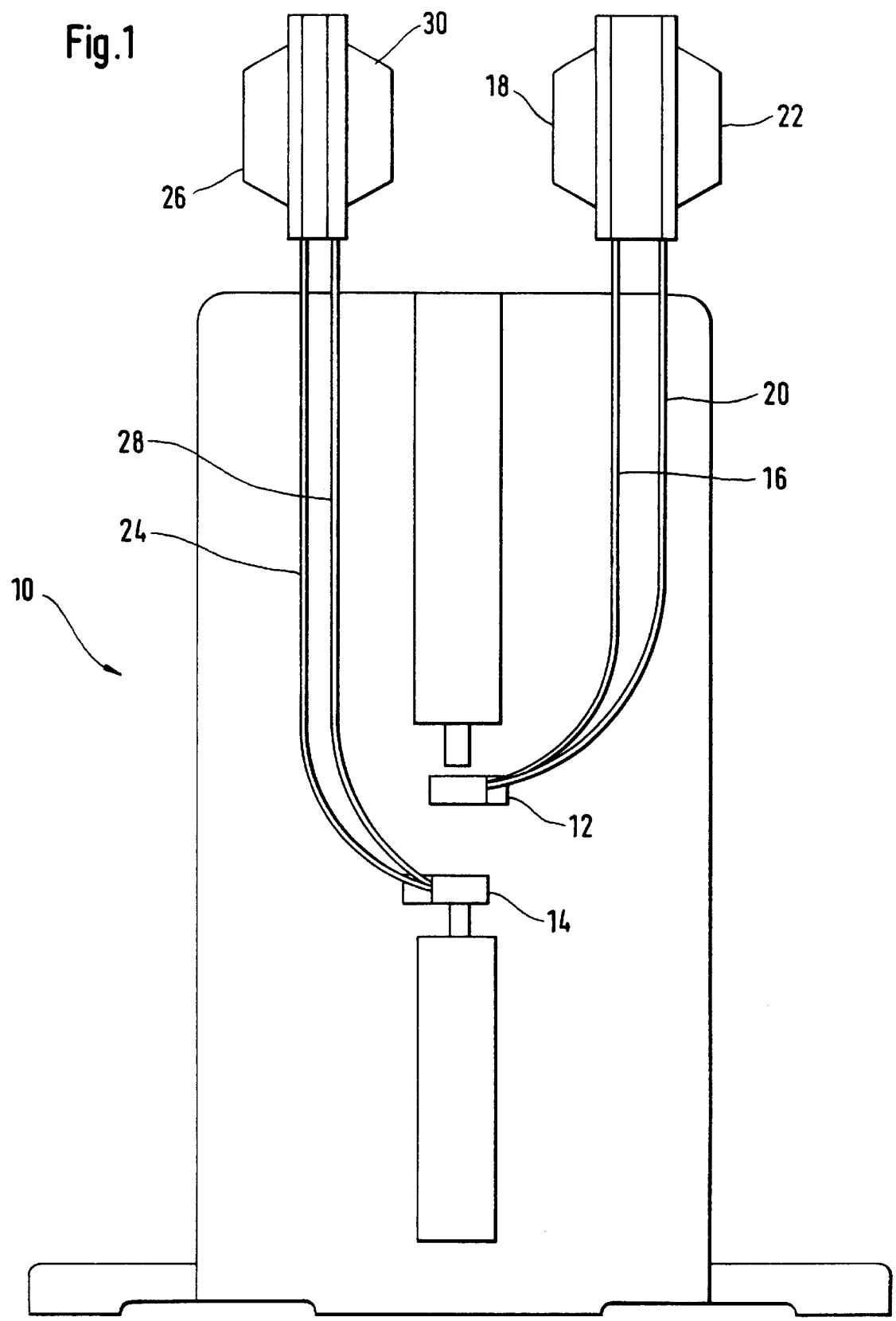
FIG. 1 is a schematic illustration of the mechanical configuration of an embodiment of a fastening device according to the invention.

The fastening device illustrated in FIG. 1 includes a press with an upper tool 12 and a lower tool 14, wherein the upper tool 12 can be moved against the lower tool 14 for fastening a snap fastener part to a textile article. Snap fastener socket parts can be supplied from a magazine 18 over a slide 16 to the upper tool 12. Also, snap fastener male parts can be supplied from a magazine 22 over a slide 20 to the upper tool 12. Fastening parts in the form of toothed rings can be supplied from magazines 26 and 30 over slides 24 and 28 to the lower tool 14. For example, chrome-plated toothed rings can be supplied from the magazine 26 to the lower tool 14, while, for example, white lacquered toothed rings can be supplied from the magazine 30 to the lower tool 14.

The supply of the snap fastener parts from the magazines 18 and 22 to the upper tool 12 and the supply of the fastening parts from the magazines 26 and 30 to the lower tool 14 are controlled in accordance with a predetermined program.

Figure 2:
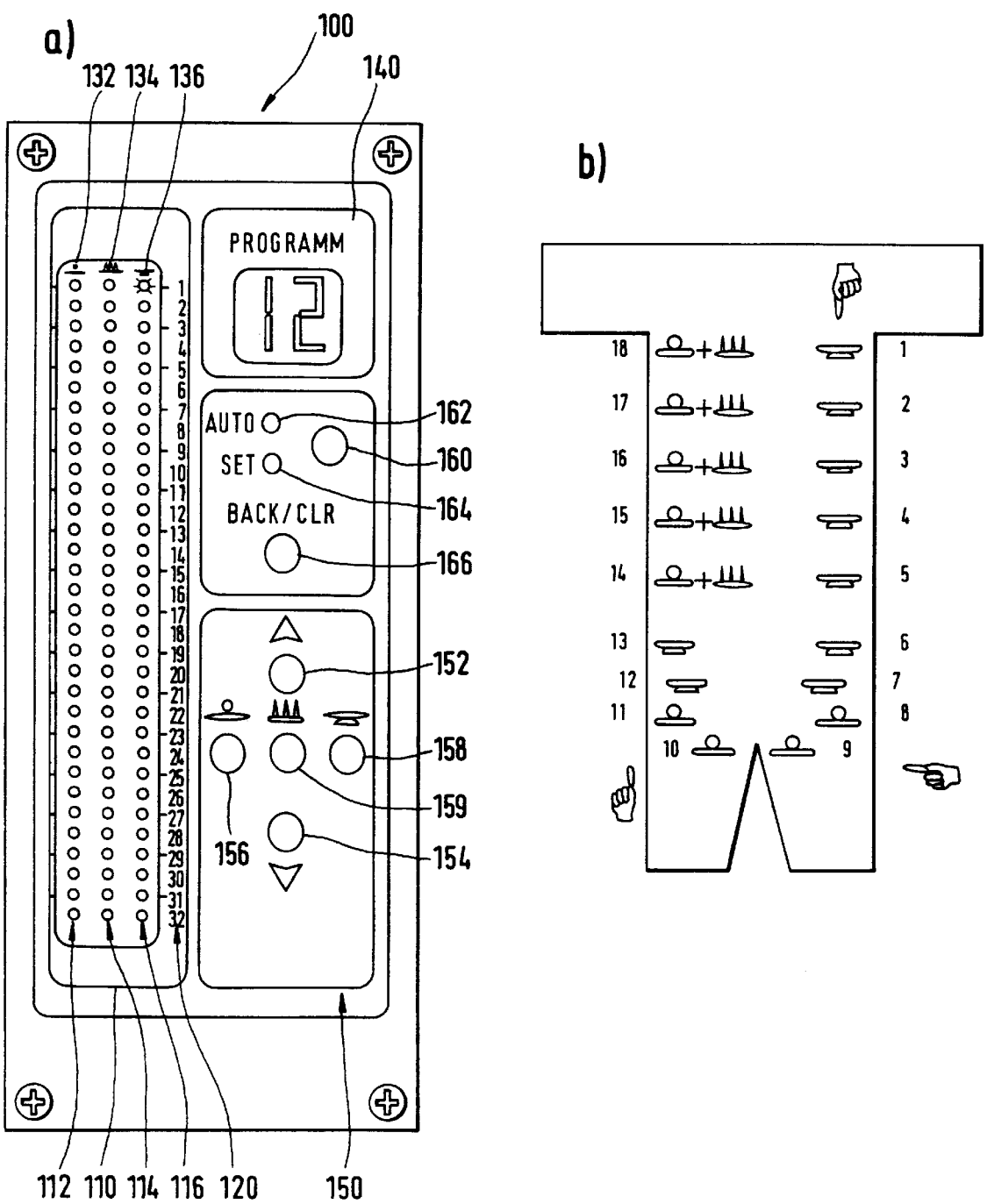
FIG. 2a is a view of a freely programmable control panel of the fastening device of FIG. 1.
FIG. 2b is a schematic illustration of an arrangement of snap fastener elements to be fastened by means of the fastening device to a child's stretch suit.

For displaying the program sequence, the fastening device is provided with a control panel 100 illustrated in FIG. 2. The control panel 100 has a display 110 with thirtytwo display fields arranged one below the other along a longitudinal edge of the panel. A marking in the form of a program step number on the panel 100 is assigned to each of the display fields, wherein the markings are arranged in a column 120 extending parallel to the longitudinal edge.

As can be seen in FIG. 2, the individual display fields are arranged one below the other in the sequence of the program steps to which they are assigned. Moreover, each display field has three display elements in the form of light diodes arranged along a line extending perpendicularly to the longitudinal edge of the panel. The display elements of the individual display fields are arranged in three columns 112, 114 and 116 extending parallel to the longitudinal edge of the panel 100. Assigned to the each of the columns 112, 114 and 116 is a marking 132, 134 or 136 which serves for identifying the type of snap fastener element to be fastened with the individual program steps.

For example, the marking 132 indicates that, when a display element of the column 112 in a display field is illuminated, a snap fastener male part is fastened with the corresponding program step. On the other hand, the marking 136 indicates that, when a display element of the column 116 in a display field is illuminated, a snap fastener socket part is fastened with the corresponding program step. Finally, the marking 134 indicates that, when a display element of the column 114 in a display field is illuminated, a white lacquered toothed ring is used for fastening the snap fastener part, while a chromium-plated toothed ring is used for fastening when the display of the column 114 in a display field is not illuminated.

Accordingly, in the state of operation of the display 110 shown in FIG. 2a, a program sequence is illustrated in which initially seven snap fastener socket parts with chromium-plated toothed rings are fastened, then four snap fastener male parts with chromium-plated toothed rings are fastened, subsequently two snap fastener socket parts with chromium-plated toothed rings are fastened and, finally, five snap fastener male parts with white lacquered toothed rings are fastened. This corresponds to the program sequence which is required for fastening eighteen snap fastener elements schematically shown in FIG. 2b to a child's stretch suit in the sequence characterized by the numbers 1 to 18 in FIG. 2b.

It is shown in FIG. 2a that the light diode of the display field belonging to column 116 is operated intermittently. This indicates that the first program step is carried out next. During operation of the fastening device, the program steps one through eighteen take place sequentially and are repeated cyclically. This makes it possible to produce large numbers without requiring a manipulation of the control panel between working on individual articles.

The control panel 100 is equipped with a device for storing a number of fastening programs. The control panel is provided with an additional display field 140 for indicating the program which has been called up. In the state illustrated in FIG. 2a, the display field 140 indicates that the 12th work program is called up.

The control panel illustrated in FIG. 2a additionally makes it possible to call up other available work programs. For this purpose, the control panel 100 is placed in a state of operation by actuating the key 160 in which the program-controlled fastening of the snap fastener elements is possible. The fact that this state of operation has been reached is indicated by illumination of the light diode 162. For calling up the next program, i.e., the program having the number 13 in the present case, the key 152 of a key area 150 must be actuated. In the state of operation illustrated in FIG. 2a, after actuating this key once, the number 13 would appear in the display field 140. In addition, the display 110 would indicate the sequence of the program number 13 by illumination of the appropriate light diodes. The preceding program, i.e., the program having number 11 in the state of operation illustrated in FIG. 2a, is reached by actuating the key 154 of the key area 150. In addition, by repeatedly pressing the key 152, the programs 14, 15, etc. can be reached, while the programs 10, 9, etc., can be reached by repeatedly pressing the key 154.

Finally, the control panel illustrated in FIG. 2a also makes possible the preparation of new programs. For this purpose, the control panel 100 can be converted to programming operation by actuating the key 160. When the programming operation is reached, the light diode 162 is turned off and the light diode 164 is illuminated. At the beginning of programming, the light diodes of the first display field are illuminated. This indicates that the first program step has to be entered next. When the key 156 of the key area 150 is then pressed, it is determined that a snap fastener male part is to be fastened with the first program step, while pressing of the key 158 determines that a snap fastener socket part is to be fastened with the first program step. By pressing the key 159 of the key area 150 once again, it is determined that the selected snap fastener part is to be fastened with a white lacquered toothed ring. When the key 159 is not actuated, the selected snap fastener part is fastened with a chromium-plated toothed ring. The preparation of the first program step can be terminated by actuating the key 154. This makes it possible to enter the next program step, i.e., the second program step in the described case. For identifying this state, the light diodes of the second display field operate intermittently. By actuating the keys 156, 158 and 159, the type of the snap fastener element to be fastened with the second program step can be selected. Programming of the additional program steps takes place analogously. In addition, the control panel illustrated in FIG. 2a permits a simple program correction by making it possible to reach the respectively preceding program step by actuating the key 152 of the key area 150. During the preparation of the program, the types of snap fastener elements determined in the program steps already entered are indicated by illumination of the appropriate light diodes in the display fields assigned to these program steps.

The finished program can be stored in the storage device under the number indicated in display field 140 by actuating the key 160. The successful storage of the program is indicated by illumination of the light diode 162 and turning off of the light diode 164. In this manner, the state of operation of the control panel 100 permitting the program-controlled fastening is simultaneously reached again.

For facilitating a correction during the program sequence, the control panel 100 has a correction key 166. After actuating this key 166 during the program sequence, the program step carried out previously is repeated.

The invention is not limited to the above-explained fastening device with four ducts. For example, the invention can also be utilized in a fastening device with three ducts in which merely the selection between two different snap fastener parts is possible, which are fastened with the same toothed rings. Moreover, the device according to the invention can also be used for fastening three or more different snap fastener parts or for fastening different types of ornamental elements.

While specific embodiments of the invention have been shown and described in detail to illustrate the inventive principles, it will be understood that the invention may be embodied otherwise without departing from such principles.

I claim:

1. A device for sequentially fastening elements of different types to a carrier material in accordance with a predetermined program including a plurality of program steps carried out in a sequence, wherein each program step determines the type of one element to be fastened, the device comprising a display arranged on a control panel for displaying the program, the display comprising a plurality of display fields, each display field being assigned to one of the program steps and being configured to be operated for indicating the type of said element being fastened with the assigned program step.

2. The device according to claim 1, wherein the display fields are arranged in the sequence of the program steps to which the display fields are assigned.

3. The device according to claim 2, wherein the display fields are arranged on the display panel along a predetermined straight line.

4. The device according to claim 3, wherein the display elements of each display field are arranged on a line extending perpendicularly to the predetermined straight line.

5. The device according to claim 4, wherein the display elements are arranged along a plurality of lines extending parallel to the predetermined straight line.

6. The device according to claim 5, comprising markings for identifying the types of elements, each marking being assigned to one of the straight lines extending parallel to the predetermined straight line.

7. The device according to claim 1, comprising a plurality of markings provided on the control panel, each marking being assigned to one of the display fields and to the program step to which the display field is assigned.

8. The device according to claim 7, wherein the markings are program step numbers.

9. The device according to claim 1, wherein each display field comprises at least two display elements.

10. The device according to claim 1, wherein the display is configured to be operated during the program sequence for indicating the display field assigned to a next program step.

11. The device according to claim 1, wherein at least one of the display fields comprises a light diode as a display element.

12. The device according to claim 11, wherein the light diode is configured to be operated intermittently.

13. The device according to claim 1, wherein each element is composed of several parts, and wherein the types of elements can be distinguished from each other at least with respect to one of the element parts.

14. The device according to claim 13, wherein each display field comprises at least two display elements for indicating a kind of one of the element parts with respect to which the types of elements can be distinguished from each other.

15. The device according to claim 1, further comprising a device for storing a number of predetermined programs, a device for selecting one of the programs and a display field for displaying information identifying the selected program.

16. A device comprising a unit for preparing a program for sequentially fastening elements of different types to a carrier material, the program including a plurality of program steps carried out in a sequence, wherein each program step determines the type of one element to be fastened, the device further comprising a display arranged on a control panel for displaying the program, the display comprising a plurality of display fields, each display field being assigned to one of the program steps and being configured to be operated for indicating the type of said one element being fastened with the assigned program step.

17. The device according to claim 16, wherein the display is configured to be operated during preparation of the program for identifying a display field assigned to a program step to be entered next.

18. The device according claim 16, wherein the display is configured to be operated during preparation of the program for displaying the types of elements determined by already entered program steps in the display fields assigned to the program steps.

19. The device according to claim 16, further comprising a device for carrying out a conversion between a programming operation and a fastening operation, and a single display for displaying the program during one of the programming operation and the fastening operation.

20. The device according to claim 19, comprising a display field configured to be operated for identifying one of the programming operation and the fastening operation.

21. The device according claim 19, further comprising a switching key for carrying out the conversion.

22. The device according to claim 16 wherein the unit for preparing the program comprises a plurality of keys configured for selecting the type of element to be fastened with each program step, and a key area including a key for selecting a next program step.

23. The device according to claim 22, further comprising a swiching key for carrying out a conversion between a programming operation and a fastening operation, wherein the display and the key area and the switching key are arranged on a single panel.

* * * * *